United States Patent
Wang et al.

(10) Patent No.: US 9,537,562 B2
(45) Date of Patent: Jan. 3, 2017

(54) SIGNAL PROCESSING METHOD AND TERMINAL

(71) Applicant: Huawei Technologies Co., Ltd., Shenzhen (CN)

(72) Inventors: Fan Wang, Shenzhen (CN); Bo Xu, Shenzhen (CN); Yuhong Chu, Shenzhen (CN); Hongping Zhang, Shenzhen (CN); Liang Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 133 days.

(21) Appl. No.: 14/272,104

(22) Filed: May 7, 2014

(65) Prior Publication Data

US 2014/0242921 A1    Aug. 28, 2014

Related U.S. Application Data

(63) Continuation of application No. PCT/CN2012/084186, filed on Nov. 7, 2012.

(30) Foreign Application Priority Data

Nov. 7, 2011  (CN) .......................... 2011 1 0348254

(51) Int. Cl.
  *H04B 7/26* (2006.01)
  *H04B 7/02* (2006.01)
  *H04W 56/00* (2009.01)
  *H04B 7/06* (2006.01)

(52) U.S. Cl.
  CPC ................ *H04B 7/26* (2013.01); *H04B 7/024* (2013.01); *H04W 56/0015* (2013.01); *H04B 7/0626* (2013.01)

(58) Field of Classification Search
None
See application file for complete search history.

(56) References Cited

U.S. PATENT DOCUMENTS

2011/0085460 A1    4/2011  Zhang et al.
2013/0094604 A1*   4/2013  Mondal et al. ............... 375/295

FOREIGN PATENT DOCUMENTS

CN    101917381 A    12/2010
CN    102137403 A    7/2011
WO    2011132721 A1  10/2011

OTHER PUBLICATIONS

Ericsson, "The Need for Measurement Report Mechanism Supporting NodeB RF Front End Calibration," TSG-RAN WG1 #48, R1-071048, Feb. 12-16, 2007, 3 pages.

* cited by examiner

Primary Examiner — Ping Hsieh
Assistant Examiner — James Yang
(74) Attorney, Agent, or Firm — Slater Matsil, LLP (57) ABSTRACT

Embodiments of the present invention provide a signal processing method and a terminal. The method includes: receiving a control signal. Channel state information between a coordinated base station and the terminal and between the serving base station and the terminal is determined. Information is about determined time difference or information about a phase difference of arrival between signals sent by the coordinated base station and the serving base station at the terminal according to the channel state information. Adjustment information is sent to the serving base station so that the serving base station adjusts the sending time, phase, or pre-coding manner of the signal according to the adjustment information.

17 Claims, 3 Drawing Sheets

SIGNAL PROCESSING METHOD AND TERMINAL

This application is a continuation of International Application No. PCT/CN2012/084186, filed on Nov. 7, 2012, which claims priority to Chinese Patent Application No. 201110348254.9, filed on Nov. 7, 2011, both of which are hereby incorporated by reference in their entireties.

TECHNICAL FIELD

The present invention relates to the field of communication technology and, in particular embodiments, to a signal processing method and a terminal.

BACKGROUND

CoMP (Coordinated multiple point) is one of the important techniques for the LTE-Advanced (Long Term Evolution-Advanced) system to expand the network edge coverage and ensure communications of edge users. The CoMP may be divided into downlink transmitting CoMP and uplink receiving CoMP. One type of the downlink transmitting CoMP is: when communicating with a terminal, a plurality of cells transmits downlink signals to the terminal simultaneously, thereby ensuring the quality of downlink signals received by the terminal.

The existing CoMP scenario may be divided into intra-eNB (intra-evolved NodeB) and inter-eNB (inter-evolved NodeB). The intra-eNB scenario is that: a plurality of cells transmits data to a terminal simultaneously where the plurality of cells belongs to one base station. Therefore, time difference or phase difference of arrival of downlink signals from the plurality of cells at the terminal can be controlled within a relative low range. The inter-eNB scenario is that: a plurality of cells transmits data to a terminal simultaneously, where the plurality of cells does not belong to one base station. Therefore, time difference or phase difference of arrival of downlink signals from the plurality of cells at the terminal is relative difficult to be controlled within a relative low range.

In order to solve the problem that, in the inter-eNB scenario, it is difficult to control time difference or phase difference of arrival between downlink signals from the plurality of cells at the terminal to be within a relative low range, the time difference or phase difference may be reduced. For example, the following take a scenario that two cells send data to a terminal simultaneously in the inter-eNB scenario as an example, where one of the two cells is a serving cell, and the other is a coordinated cell. The terminal respectively calculates time difference of sending downlink data between two cells according to CSI-RS (Channel State Information-Reference Signal) sent by the two cells; the terminal obtains information about time difference or information about phase difference between the two cells according to the time differences; the terminal sends the information about time difference or information about phase difference to the serving cell, and the serving cell shares the information about time difference or information about phase difference with the coordinated cell; the coordinated cell adjusts the sending time, phase, or pre-coding manner of transmitted signals according to the information about time difference or the information about phase difference.

SUMMARY OF THE INVENTION

Embodiments of the present invention provide a signal processing method and a terminal, which solve the problem that time difference or phase difference between signals which are sent by at least two cells and received by a terminal is relative big in the inter-eNB scenario.

Embodiments of the present invention provide the following technical solutions.

A signal processing method, includes receiving a control signaling, where the control signaling is used for instructing a terminal to send adjustment information to a serving base station of the terminal. Channel state information between a coordinated base station and the terminal, and between the serving base station and the terminal is determined. Information is determined about time difference or information about phase difference of arrival between signals sent by the coordinated base station and the serving base station at the terminal according to the channel state information. Adjustment information is sent to the serving base station. The adjustment information includes the information about time difference or information about phase difference.

A terminal, includes a receiving unit, which is configured to receive a control signaling. The control signaling is used for instructing a terminal to send adjustment information to a serving base station of the terminal. A determining unit is configured to determine channel state information between a coordinated base station and the terminal, and between the serving base station and the terminal. An acquiring unit is configured to acquire information about time difference or information about phase difference of arrival between signals sent by the coordinated base station and the serving base station at the terminal according to the channel state information. A sending unit is configured to send the adjustment information to the serving base station. The adjustment information includes the information about time difference or information about phase difference.

According to the signal processing method and the terminal provided by embodiments of the present invention, a control signaling is received, where the control signaling is used for instructing a terminal to send adjustment information to a serving base station of the terminal. Channel state information between the coordinated base station and the terminal, and between the serving base station and the terminal is determined. Information about time difference or information about phase difference of arrival between signals sent by the coordinated base station and the serving base station at the terminal is acquired according to the channel state information. The adjustment information is sent to the serving base station. The adjustment information comprises the information about time difference or information about phase difference. In the inter-eNB scenario, the serving base station adjusts the sending time, phase, or pre-coding manner of the signal according to the adjustment information, thus the time difference or phase difference of the signals which are sent by at least two cells and received by the terminal can be reduced.

BRIEF DESCRIPTION OF THE DRAWINGS

In order to make the technical solutions of embodiments of the present invention more clearly, the accompanying drawings used in the description of embodiments of the present invention are briefly described hereunder. Obviously, the described drawings are merely some embodiments of present invention. For persons skilled in the art, other drawings may be obtained based on these drawings without any creative work.

DETAILED DESCRIPTION OF ILLUSTRATIVE EMBODIMENTS

The technical solutions in embodiments of the present invention are hereinafter described clearly and completely with reference to the accompanying drawings in embodiments of the present invention. Obviously, the described embodiments are only a part of embodiments of the present invention, rather than all embodiments of the present invention. All the other embodiments obtained by persons of ordinary skill in the art based on embodiments of the present invention without any creative efforts shall fall within the protection scope of the present invention.

Figure 1:
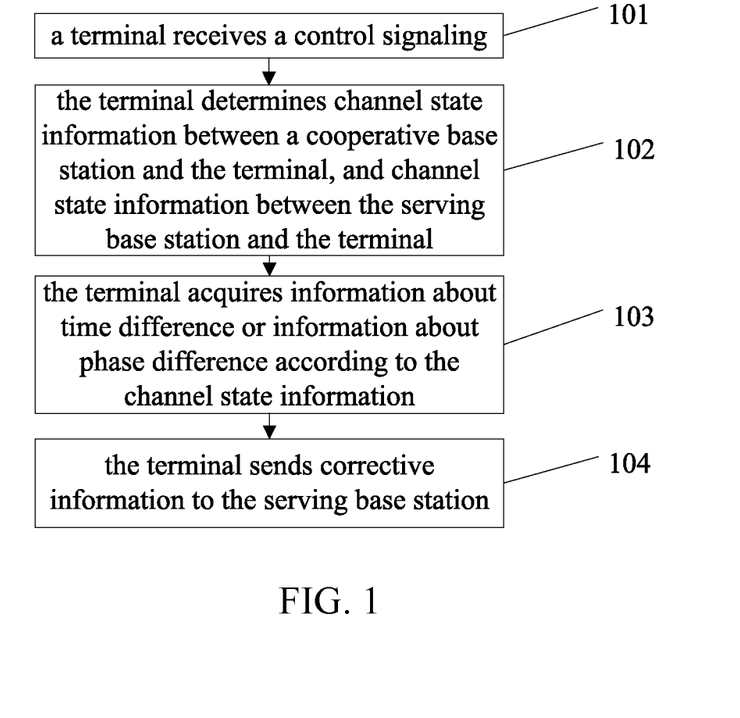
FIG. 1 is a schematic diagram of a signal processing method according to an embodiment of the present invention.

This embodiment provides a signal processing method, as shown in FIG. 1. The method may include the following steps.

101. A terminal receives a control signaling, where the control signaling is used for instructing the terminal to send adjustment information to a serving base station of the terminal.

The control signaling may be a downlink control signaling or a high layer signaling.

The adjustment information may include: information about time difference or information about phase difference of arrival between signals sent by the coordinated base station and the serving base station at the terminal.

In the inter-eNB scenario, the terminal receives signals sent by a plurality of cells, generally, there is the time difference or phase difference of arrival between signals which are sent by the plurality of cells to the terminal at the terminal, if the time difference or phase difference is greater than a preset value, the performance of CoMP is deteriorated.

The serving base station adjusts the signals sent to the terminal according to the adjustment information sent by the terminal, so that the time difference or phase difference of arrival between signals which are sent by the plurality of cells to the terminal at the terminal is reduced. The terminal sends the adjustment information to the serving base station according to the received control signaling.

102. The terminal determines channel state information between a coordinated base station and the terminal, and channel state information between the serving base station and the terminal.

The terminal detects CRS (Cell-specific reference signals) or CSI-RS, and determines the channel state information between the coordinated base station and the terminal, and between the serving base station and the terminal according to the CRS or CSI-RS, where a channel through which signals are sent to the terminal is subordinate to the coordinated base station and the serving base station.

The channel state information may include: at least one of channel load information, channel quality, time needs for transmitting a signal through the channel, time of arrival of signals, and sending time of signals.

103. The terminal acquires information about time difference or information about phase difference according to the channel state information between the coordinated base station and the terminal and the channel state information between the serving base station and the terminal.

The channel state information is information of a certain channel, and can not reflect a relationship between channels, or between signals sent by the serving base station and the coordinated base station, e.g., the time difference or phase difference, etc.

Therefore, the terminal acquires the information about time difference or information about phase difference according to the channel state information.

104. The terminal sends adjustment information to the serving base station.

After the serving base station receives the adjustment information, the serving base station may perform processing on a sent signal according to the adjustment information, for example, adjust the sending time, phase, or pre-coding manner of the signal according to the adjustment information. Thus, the time difference or phase difference between signals which are sent by a plurality of channels and received by the terminal may be reduced.

In the signal processing method according to this embodiment, a control signaling is received, where the control signaling is used for instructing a terminal to send adjustment information to a serving base station of the terminal. Channel state information between the coordinated base station and the terminal, and between the serving base station and the terminal is determined. Information about time difference or information about phase difference of arrival between signals sent by the coordinated base station and the serving base station at the terminal is acquired according to the channel state information. The adjustment information is sent to the serving base station. The adjustment information comprises the information about time difference or information about phase difference. In the inter-eNB scenario, the serving base station adjusts the sending time, phase, or pre-coding manner of the signal according to the adjustment information, thus the time difference or phase difference of the signals which are sent by at least two cells and received by the terminal can be reduced.

Figure 2:
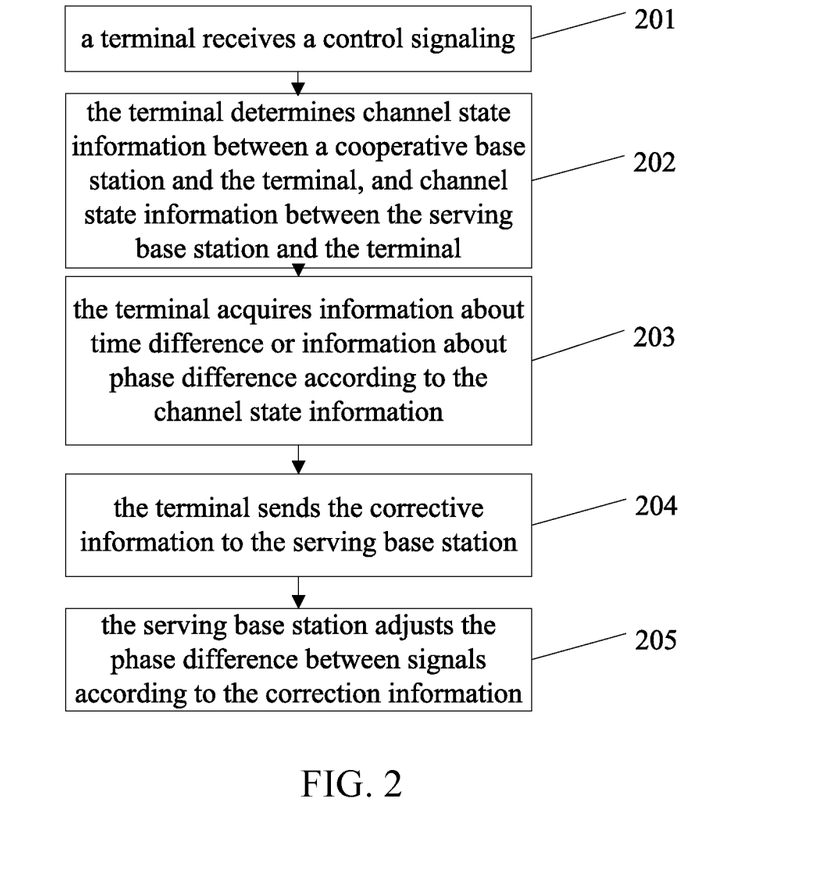
FIG. 2 is a schematic diagram of a signal processing method according to another embodiment of the present invention.

Embodiments of the present invention provide another signal processing method, as shown in FIG. 2. This method includes the following steps.

201. A terminal receives a control signaling, where the control signaling is used for instructing the terminal to send adjustment information to a serving base station of the terminal.

In the inter-eNB scenario, the terminal receives signals sent by a plurality of cells, generally, there is the time difference or phase difference of arrival between signals which are sent by the plurality of cells to the terminal at the terminal, if the time difference or phase difference is greater than a preset value, the performance of CoMP is deteriorated.

The terminal sends the adjustment information to the serving base station according to the received control signaling. The serving base station adjusts the signals sent to the terminal according to the adjustment information sent by the terminal, so that the time difference or phase difference of arrival between signals which are sent by the plurality of cells to the terminal at the terminal is reduced.

The adjustment information may include: information about time difference or information about phase difference of arrival between signals sent by the coordinated base station and the serving base station at the terminal.

The information about time difference includes at least one of: time of arrival of signals sent by the coordinated base station and the serving base station at the terminal, and data used for describing time difference of arrival between signals at the terminal; the information about phase difference includes at least one of phase of arrival of signals sent by the coordinated base station and the serving base station at the terminal, and data used for describing phase difference of arrival between signals at the terminal.

Further, the control signaling may be a downlink control signaling or a high layer signaling.

As an implementation of this embodiment, the high layer signaling may satisfy the following requirements:

1. The high layer signaling may be set to report immediately, or report periodically.

2. The high layer signaling employs a media access control control unit signaling, or a radio resource control signaling.

Further, alternatively, the control signaling is transmitted in a format of format (format) 1A.

The control signaling employs the format of format 1A for transmission, so that the terminal can receive the control information in any transmission mode; when the control signaling is transmitted in format 1A, the overhead of this transmission is low.

As an implementation of this embodiment, the control signaling may be transmitted in a format of format 1A, or format 1C. The format 1A may be used for unicast, when a base station sends signals with different contents to specific terminals, the contents may be transmitted by using signals with the format of format 1A; the format 1C may be only used for broadcast, when a base station sends a same signal to all the terminals, the format 1A can be employed for transmission. For example, in the CoMP environment, the base station sends the same signal to all the terminals, hence, format 1C may be employed for transmitting the signal to the terminals.

As an implementation of this embodiment, the control signaling may be scrambled by using a C-RNTI (Cell-Radio Network Temporary Identifier), therefore, the format 1A is employed for transmitting the control signaling; if the control signaling is scrambled by using a CoMP-RNTI (CoMP-Radio Network Temporary Identifier), due to that a base station needs to transmit a same signal to a plurality of terminals in this case, therefore, the format 1C which has a relative low pay load is employed for transmitting the control signaling.

202. The terminal determines channel state information between a coordinated base station and the terminal, and channel state information between the serving base station and the terminal.

The terminal detects CRS or CSI-RS, and determines channel state information according to the CRS or CSI-RS, where a channel through which signals are sent to the terminal is subordinate to the coordinated base station and the serving base station, and the channel state information may be channel state information between the coordinated base station and the terminal, and between the serving base station and the terminal.

The channel state information may include: at least one of channel load information, channel quality, time needs for transmitting a signal through the channel, time of arrival of signals, and sending time of signals.

203. The terminal acquires information about time difference or information about phase difference according to the channel state information between the coordinated base station and the terminal and the channel state information between the serving base station and the terminal.

The channel state information is information of a certain channel, and can not reflect a relationship between channels, or between signals sent by the serving base station and the coordinated base station, e.g., the time difference or phase difference between signals, etc.

Therefore, the terminal acquires the information about time difference or information about phase difference according to the channel state information. For example, the terminal estimates the phases of signals transmitted through each channel according to the load of each channel in the state information, acquires the phases of arrival of signals at the terminal through each channel, and then the terminal calculates the information about time difference or information about phase difference according to phase of arrival of each signal at the terminal.

In embodiments of the present invention, the method for acquiring the information about time difference or the information about phase difference is not limited, which may be any methods known by persons skilled in the art.

204. The terminal sends the adjustment information to the serving base station.

By means of sending the adjustment information to the serving base station by the terminal, the serving base station can adjust the sending time, phase, or pre-coding manner of the signal according to the adjustment information.

As an implementation of this embodiment, the terminal may send adjustment information to the serving base station through a physical shared channel or a physical control channel.

Based on an example that the control signaling employs the downlink control signaling, employs the format of format 1A and is scrambled by using the C-RNTI, the following describes the sending the adjustment information to the serving base station.

As an implementation of this embodiment, when the terminal sends the adjustment information to the serving base station through the physical control channel, information bits of the format 1A satisfies the following conditions: behind a format 0 or format 1A indicator, 1. Localized/distributed VRB (Virtual Resource Block) assignment flag: a localized/distributed virtual resource block occupies 1 bit, where the 1 bit is set to '1'.

2. Resource block assignment: a resource block occupies $\lceil\log_2(N_{RB}^{DL}(N_{RB}^{DL}+1)/2)\rceil$ bits, where the $\lceil\log_2(N_{RB}^{DL}(N_{RB}^{DL}+1)/2)\rceil$ bits are all set to '1', where $N_{RB}^{DL}$ represents the downlink bandwidth.

3. Bits behind the 1 bit occupied by the localized/distributed virtual resource block, or behind the $\lceil\log_2(N_{RB}^{DL}(N_{RB}^{DL}+1)/2)\rceil$ bits occupied by the resource block are all set to '0'.

The physical control channel satisfies the following conditions: the adjustment information is reported in a latest periodic CQI (Channel Quality Information) uplink subframe after the control signaling arrives at the terminal, and the periodic CQI is not sent.

When the terminal sends adjustment information to the serving base station through the physical shared channel, information bits of the format 1A satisfies the following conditions: behind a format 0 or format 1A indicator.

1. Localized/distributed VRB assignment flag: a centralized or distributed virtual resource block occupies 1 bit, where the 1 bit is set to '1'.

2. Resource block assignment: a resource block occupies $\lceil\log_2(N_{RB}^{DL}(N_{RB}^{DL}+1)/2)\rceil$ bits, where the $\lceil\log_2(N_{RB}^{DL}(N_{RB}^{DL}+1)/2)\rceil$ bits are all set to '1', where $N_{RB}^{DL}$ represents the downlink bandwidth.

3. The $\lceil\log_2(N_{RB}^{DL}(N_{RB}^{DL}+1)/2)\rceil$ bits represent a resource block transmitted through a physical uplink shared channel.

4. Bits behind the 1 bit occupied by the localized/distributed virtual resource block, or behind the $\lceil\log_2(N_{RB}^{DL}(N_{RB}^{DL}+1)/2)\rceil$ bits occupied by the resource block are all set to '0'.

If the control signaling arrives at the terminal in a sub-frame n, whereby the terminal may transmit the adjustment information in a sub-frame n+4 through the physical shared channel, and a frequency domain resource used for indicating the adjustment information is carried in the control signaling, where n is a non-negative integer, and length unit of each sub-frame is millisecond.

Further, alternatively, the terminal may also send the adjustment information to the serving base station through a predefined channel.

The terminal may not only send the adjustment information to the serving base station through the physical shared channel or the physical control channel, but also send the adjustment information to the serving base station through the predefined channel.

After receiving a signal, the serving base station needs to convert the signal into a processable format firstly. If the signal is transmitted in a format that can be processed by the serving base station, the step for converting the signal format is omitted after the signal is received by the serving base station.

The predefined channel is established according to the format of the adjustment information, that is, the predefined channel is designed into a channel which is suitable for transmitting the adjustment information, thereby improving the compatibility of the predefined channel and the adjustment information.

Specifically, the terminal sends the adjustment information to the serving base station through the predefined channel, since the format of the adjustment information is suitable for being processed by the serving base station, and the predefined channel is established according to the format of the adjustment information, therefore, the compatibility of the adjustment information, the predefined channel and the serving base station is improved.

As an implementation of this embodiment, the predefined channel satisfies the following conditions:

1. The adjustment information is represented by M bits, where the M is an integer greater than 0, typically, M=4.

2. If the control signaling arrives at the terminal in a sub-frame n, then the terminal may send the adjustment information in a sub-frame n+K, typically, K=4, where the sub-frame is millisecond, and the K is an integer greater than 0.

3. The adjustment information employs RM (Reed-Muller) coding, typically, employs RM (20, M) coding.

4. The adjustment information is mapped to a physical resource in manner of the periodic CQI, and the mapping resource is deployed by a high layer.

5. When the adjustment information and the periodic CQI information are sent simultaneously, the periodic CQI information is not sent.

6. The adjustment information employs a coding manner which is the same as that of non-periodic CQI, typically, employs RM (32, M) coding.

Further, alternatively, the terminal sends the adjustment information to the serving base station through a high layer signaling.

As an implementation of this embodiment, the high layer signaling is sent immediately, or is sent every preset time; the high layer signaling employs a media access control control unit signaling, or a radio resource control signaling.

The high layer signaling is suitable for being processed by a base station, and is also suitable for being processed by the terminal, therefore, the sending unit employs the high layer signaling to send the adjustment information to the serving base station.

205. The serving base station processes the signal according to the adjustment information.

For example, the serving base station may adjust the sending time, phase, or pre-coding manner of the signal.

In order to reduce the time difference or phase difference of signals which are sent through the plurality of channels and received by the terminal, the serving base station needs to adjust the sending time, phase, or pre-coding manner of transmitted signals according to the adjustment information sent by the terminal.

If the serving base station receives only the information about time difference, the serving base station calculates the corresponding information about phase difference according to the information about time difference, finally a base station adjusts the sending time, phase, or pre-coding manner of transmitted signals according to the information about phase difference.

In the signal processing method according to this embodiment, a control signaling is received, where the control signaling is used for instructing a terminal to send adjustment information to a serving base station of the terminal, where the adjustment information includes the information about time difference of arrival or the information about phase difference of arrival of signals sent by the coordinated base station and the serving base station at the terminal, the information about time difference includes at least one of: time of arrival of signals at the terminal, and data used for describing time difference of arrival between signals at the terminal, the information about phase difference includes at least one of: phase of arrival of signals at the terminal, and data used for describing phase difference of arrival between signals at the terminal; channel state information between the coordinated base station and the terminal, and between the serving base station and the terminal is determined; information about time difference or information about phase difference is acquired according to the channel state information; the adjustment information is sent to the serving base station, so that the serving base station can adjust the sending time, phase, or pre-coding manner of the signals according to the adjustment information. In the inter-eNB scenario, the serving base station adjusts the sending time, phase, or pre-coding manner of the signal according to the adjustment information, thus the time difference or phase difference of the signals which are sent by at least two cells and received by the terminal can be reduced.

This embodiment provides another signal processing method.

Firstly, the serving base station sends a control signaling to a terminal.

The control signaling may be a downlink control signaling or a high layer signaling.

Sending the control signaling to the terminal is used for instructing the terminal to send adjustment information to a serving base station of the terminal.

Secondly, the serving base station receives the adjustment information sent by the terminal, and performs processing on a to-be-sent signal according to the adjustment information.

For example, the sending time, phase, or pre-coding manner of the signal may be adjusted.

The adjustment information includes: information about time difference or information about phase difference of arrival between signals sent by the coordinated base station and the serving base station at the terminal.

The information about time difference includes at least one of: time of arrival of signals sent by the coordinated base station and the serving base station at the terminal, and data used for describing time difference of arrival between signals; the information about phase difference includes at least one of: phase of arrival of signals sent by the coordinated base station and the serving base station at the terminal, and data used for describing phase difference of arrival between signals.

The method for acquiring the adjustment information by the terminal according to this embodiment may be referred to contents provided in the foregoing method embodiments.

In order to reduce the time difference or phase difference of signals which are transmitted through a plurality of channels and received by the terminal, the serving base station needs to adjust the sending time, phase, or pre-coding manner of transmitted signals according to the adjustment information sent by the terminal.

If a base station receives the information about time difference, whereby calculates the corresponding information about phase difference according to the information about time difference, and finally adjusts the sending time, phase, or pre-coding manner of transmitted signals according to the information about phase difference.

The signal processing method according to this embodiment, the serving base station sends the control signaling to the terminal; the serving base station receives the adjustment information sent by the terminal, and adjusts the sending time, phase, or precoding manner of the signal according to the adjustment information. By means of adjusting the sending time, phase, or precoding manner of the signal, so as to reduce the time difference or phase difference about the signal sent to the terminal reaching the terminal.

Figure 3:
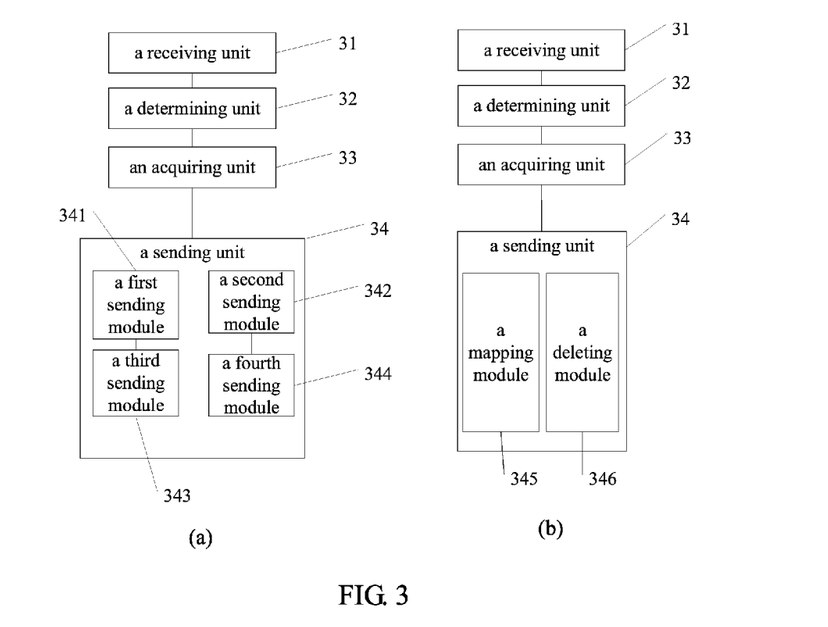
FIG. 3 is a schematic structural diagram of a terminal according to an embodiment of the present invention.

This embodiment provides a terminal, the terminal can implement the signal processing method according to foregoing embodiments of the present invention, as shown in FIG. 3, including a receiving unit 31, a determining unit 32, an acquiring unit 33, and a sending unit 34.

The sending unit 34 includes a first sending module 341, a second sending module 342, a third sending module 343, a fourth sending module 344, a mapping module 345, and a deleting module 346.

The receiving unit 31, configured to receive a control signaling.

The control signaling is used for instructing a terminal to send adjustment information to a serving base station of the terminal, the adjustment information includes: information about time difference or information about phase difference of arrival between signals sent by the coordinated base station and the serving base station at the terminal, the information about time difference includes at least one of: time of arrival of signals at the terminal, and data used for describing time difference of arrival between signals; the information about phase difference includes at least one of: phase of arrival of signals at the terminal, and data used for describing phase difference of arrival between signals.

Further, the control signaling may include: a downlink control signaling, or a high layer signaling. The downlink control signaling may employ a format of format 1A, or of format 1C for transmission.

The determining unit 32, configured to determine channel state information between the coordinated base station and the terminal, and between the serving base station and the terminal.

The terminal detects CRS or CSI-RS, the determining unit 32 determines the channel state information according to the CRS or CSI-RS, where a channel through which signals are sent to the terminal is subordinate to the coordinated base station and the serving base station, and the channel state information may be channel state information between the coordinated base station and the terminal, and between the serving base station and the terminal.

The channel state information may include: at least one of channel load information, channel quality, time needs for transmitting a signal through the channel, time of arrival of signals, and sending time of signals.

The acquiring unit 33, configured to acquire information about time difference or information about phase difference according to the channel state information.

The channel state information is information of a certain channel, and can not reflect a relationship between channels, or between signals sent by the serving base station and the coordinated base station, e.g., the time difference or phase difference between signals, etc.

Therefore, the acquiring unit 33 acquires the information about time difference or information about phase difference of arrival of signals which are sent by the coordinated base station and the serving base station to the terminal for responding to a same operation of the terminal at the terminal according to the channel state information.

The sending unit 34, configured to send the adjustment information to the serving base station, so that the serving base station can perform processing to a to-be-sent signal according to the adjustment information, e.g., adjust the sending time, phase, or pre-coding manner of the signal.

The first sending module 341, configured to send adjustment information to the serving base station through a physical control channel.

As an implementation of this embodiment, when the terminal sends the adjustment information to the serving base station through the physical control channel, information bits of the format 1A satisfies the following conditions: behind a format 0 or format 1A indicator, 1. Localized/distributed VRB (Virtual Resource Block) assignment flag: a localized/distributed virtual resource block occupies 1 bit, where the 1 bit is set to '1'.

2. Resource block assignment: a resource block occupies $\lceil \log_2(N_{RB}^{DL}(N_{RB}^{DL}+1)/2) \rceil$ bits, where the $\lceil \log_2(N_{RB}^{DL}(N_{RB}^{DL}+1)/2) \rceil$ bits are all set to '1', where $N_{RB}^{DL}$ represents the downlink bandwidth.

3. Bits behind the 1 bit occupied by the localized/distributed virtual resource block, or behind the $\lceil \log_2(N_{RB}^{DL}(N_{RB}^{DL}+1)/2) \rceil$ bits occupied by the resource block are all set to '0'.

The second sending module 342, configured to send adjustment information to the serving base station through a physical shared channel.

When the terminal sends adjustment information to the serving base station through the physical shared channel, information bits of the format 1A satisfies the following conditions: behind a format 0 or format 1A indicator, 1. Localized/distributed VRB assignment flag: a centralized or distributed virtual resource block occupies 1 bit, where the 1 bit is set to '1'.

2. Resource block assignment: a resource block occupies $\lceil \log_2(N_{RB}^{DL}(N_{RB}^{DL}+1)/2) \rceil$ bits, where the $\lceil \log_2(N_{RB}^{DL}(N_{RB}^{DL}+1)/2) \rceil$ bits are all set to '1', where $N_{RB}^{DL}$ represents the downlink bandwidth.

3. The $\lceil \log_2(N_{RB}^{DL}(N_{RB}^{DL}+1)/2) \rceil$ bits represent a resource block transmitted through a physical uplink shared channel.

4. Bits behind the 1 bit occupied by the localized/distributed virtual resource block, or behind the $\lceil \log_2(N_{RB}^{DL}(N_{RB}^{DL}+1)/2) \rceil$ bits occupied by the resource block are all set to '0'.

The third sending module 343, configured to, if the adjustment information is sent to the serving base station through the physical control channel, the physical control channel transmits the adjustment information in a latest periodic channel quality information uplink sub-frame after the control signaling arrives, and the physical control channel does not send periodic channel quality information.

Further, alternatively, if the adjustment information is sent to the serving base station through the physical control channel, information bits of the format 1A satisfies the following conditions: behind a format 0 or format 1A indicator, localized/distributed virtual resource block assignment flag: 1 bit is set to '1'; resource block assignment: $\lceil \log_2(N_{RB}^{DL}(N_{RB}^{DL}+1)/2) \rceil$ bits are entirely set to '1', where $N_{RB}^{DL}$ represents the downlink bandwidth; the following bits are all set to '0'.

The fourth sending module 344, configured to, if the adjustment information is sent to the serving base station through the physical shared channel, the adjustment information is transmitted in a sub-frame n+4 through the physical shared channel, where the control signaling arrives at the terminal in a sub-frame n, where n is a non-negative integer.

The sending unit 34 may not only send the adjustment information to the base station through the physical shared channel or the physical control channel, but also send the adjustment information to the base station through a pre-defined channel.

Further, alternatively, the sending unit 34 sends the adjustment information to the serving base station through the predefined channel.

The sending unit 34 is configured to send the adjustment information in a sub-frame n+K through the predefined channel, where, K is an integer greater than 0, the control signaling arrives at the terminal in a sub-frame n, and n is a non-negative integer.

The mapping module 345, configured to map the adjustment information to a physical resource in manner of periodic channel quality information through the predefined channel.

The deleting module 346, configured to, not to send the periodic channel quality information if the adjustment information and the periodic channel state information are sent simultaneously.

When the sending unit 34 sends the adjustment information to the serving base station through the predefined channel, the adjustment information sent by the sending unit 34 through the predefined channel are represented by M bits, where, M is an integer greater than 0; the adjustment information employs Reed-Muller coding.

After receiving a signal, the serving base station needs to convert the signal into a process-able format firstly. If the signal is transmitted in a format that can be processed by the serving base station, the step for converting the signal format is omitted after the signal is received by the serving base station, and thereby the compatibility of the predefined channel and the adjustment information is improved.

Further, alternatively, the sending unit 34 sends the adjustment information to the serving base station through a high layer signaling.

As an implementation of this embodiment, the high layer signaling is sent immediately, or is sent every preset time; the high layer signaling employs a media access control control unit signaling, or a radio resource control signaling.

The high layer signaling is suitable for being processed by a base station, and is also suitable for being processed by the terminal, therefore, the sending unit employs the high layer signaling to send the adjustment information to the serving base station.

According to the terminal provided by this embodiment, a control signaling is received, where the control signaling is used for instructing a terminal to send adjustment information to a serving base station of the terminal, where the adjustment information includes the information about time difference of arrival or the information about phase difference of arrival of signals sent by the coordinated base station and the serving base station at the terminal, the information about time difference includes at least one of: time of arrival of signals at the terminal, and data used for describing time difference of arrival between signals at the terminal, the information about phase difference includes at least one of: phase of arrival of signals at the terminal, and data used for describing phase difference of arrival between signals at the terminal; channel state information between the coordinated base station and the terminal, and between the serving base station and the terminal is determined; information about time difference or information about phase difference is acquired according to the channel state information; the adjustment information is sent to the serving base station, so that the serving base station can adjust the sending time, phase, or pre-coding manner of the signals according to the adjustment information. In the inter-eNB scenario, the serving base station adjusts the sending time, phase, or pre-coding manner of the signal according to the adjustment information, thus the time difference or phase difference of the signals which are sent by at least two cells and received by the terminal can be reduced.

Figure 4:
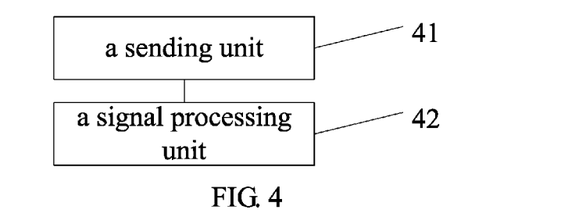
FIG. 4 is a schematic structural diagram of a base station according to an embodiment of the present invention.

Embodiments of the present invention further provides a base station, the base station may be used for realizing the signal processing method as shown in FIG. 1 and FIG. 2 according to embodiments of the present invention, as shown in FIG. 4, the base station may include:

A sending unit 41, which may be configured to send a control signaling to a terminal.

The control signaling may be a downlink control signaling or a high layer signaling.

Sending the control signaling to the terminal is used for instructing the terminal to send adjustment information to a serving base station of the terminal.

A signal processing unit 42, which may be configured to receive the adjustment information sent by the terminal, and performs processing on a to-be-sent signal according to the adjustment information.

The adjustment information includes: information about time difference or information about phase difference of arrival or the information about phase difference of arrival of signals sent by the coordinated base station and the serving base station at the terminal.

The information about time difference includes at least one of: time of arrival of signals at the terminal, and data used for describing time difference of arrival between signals at the terminal, the information about phase difference includes at least one of: phase of arrival of signals at the terminal, and data used for describing phase difference of arrival between signals at the terminal.

According to the base station provided by this embodiment, a control signaling is sent to a terminal. Adjustment information sent by the terminal is received. The sending time, phase, or pre-coding manner of the signal are adjusted according to the adjustment information. By means of adjusting the sending time, phase, or pre-coding manner of the signal, the time difference or phase difference of arrival of the signals at the terminal can be reduced.

Persons skilled in the art can understand that the information, signaling, data, bits, etc. in embodiments of the present invention may pass through the voltage, current, electromagnetic wave, magnetic field or magnetic particles (magnetic particles), optical field or optical particles (optical particles), or any combination of the above.

Persons skilled in the art may also understand that various illustrative logical blocks (illustrative logical block) and steps (step) as described in embodiments of the present invention may be implemented via an electronic hardware, a computer software, or a combination of both. In order to clearly display the interchangeability (interchangeability) of a hardware and software, the foregoing various illustrative components (illustrative components) and steps have described their functions universally. Such functions are implemented via either hardware or software depends on a specific appliance and design requirements for the entire system. For each specific application, persons skilled in the art may adopt various methods to implement the functions, and such implementation shall not be interpreted as going beyond the protection scope of embodiments of the present invention.

The described functions of the various illustrative logic blocks, modules, and units as described in embodiments of the present invention may be implemented or operated via a general processor, a digital signal processor, an application specific integrated circuit (ASIC), a field programmable gate array (FPGA) or other programmable logic devices, a discrete gate or a transistor logic, a discrete hardware component, or any combination of the above design. The general processor may be a microprocessor and, alternatively, the general processor may also be any conventional processor, controller, microcontroller or state machine. The processor may also be implemented via a combination of computing devices, such as a digital signal processor and a microprocessor, a plurality of microprocessors, and one or more microprocessors associated with one digital signal processor core, or may be implemented via any other similar configurations.

The method or algorithm steps as described in embodiments of the present invention may be directly embedded into a hardware, a software module performed by a processor, or a combination of both. The software module may be stored in a RAM memory, a flash memory, a ROM memory, an EPROM memory, an EEPROM memory, a register, a hard disk, a removable disc, a CD-ROM or any other forms of storage media in the art. Exemplarily, a storage medium may be connected to a processor, so that the processor may read information from the storage medium, and store and write information to the storage medium. Alternatively, the storage medium may also be integrated into the processor. The processor and the storage medium may be provided in the ASIC, and the ASIC may be provided in a user terminal. Alternatively, the processor and the storage medium may also be provided in different components of the user terminal.

In one or more exemplary designs, the foregoing functions as described in embodiments of the present invention may be implemented in a hardware, a software, a firmware, or any combination of these three. If it is implemented in the software, these functions may be stored in a computer-readable medium, or may be transmitted in the computer-readable medium in a form of one or more instructions or codes. The computer-readable medium includes a computer-storable medium and a communication medium which is facilitate to allow a computer program being transferred from one place to other places. The storage medium may be an available medium which may be accessed to by any general or special computers. For example, such a computer-storable medium may include but not limited to the RAM, ROM, EEPROM, CD-ROM or other disk storages, disc storages or other magnetic storage devices, or any other medias which may be used for carrying or storing program codes which can be read by the general or special computer, or the general or special processor in a form of instructions or data structure. In addition, any connection may be properly defined as the computer-readable medium, e.g., if the software is transmitted from a website, a server or other remote resources via a coaxial cable, a fiber-optical computer, a twisted-pair and a digital subscriber line (DSL), or is transmitted in a way of wireless transmission such as the infrared, the wireless and the microwave, etc., will also be included in the defined computer-readable medium. The disk (disk) and disc (disc) include compact disc, laser disc, CD, DVD, floppy disk, blue ray disc. The disc copies the data by magnetism usually, and the disk optically copies the data by laser. A combination of the foregoing may also be included in the computer-readable medium.

The above descriptions are merely implementations of the present invention. However, the protection scope of the present invention is not limited thereto. Any persons skilled in the art may easily think of modifications or replacements within the scope of techniques disclosed in the present invention, which should be included in the protection scope of the present invention. Therefore, the protection scope of the present invention should be subject to that of the claims.

What is claimed is:

1. A signal processing method, comprising:
receiving a control signaling, wherein the control signaling is used for instructing a terminal to send adjustment information to a serving base station of the terminal;
determining channel state information between a coordinated base station and the terminal and between the serving base station and the terminal;
acquiring information about a time difference or information about a phase difference of arrival between signals sent by the coordinated base station and the serving base station at the terminal according to the channel state information; and
sending adjustment information to the serving base station, wherein the adjustment information comprises the information about time difference or information about phase difference, and wherein the adjustment information is sent to the serving base station through a physical control channel or a physical shared channel, when the adjustment information is sent to the serving base station through the physical control channel, the adjustment information is transmitted through the physical control channel in a latest periodic channel quality information uplink sub-frame after the control signaling arrives, and periodic channel quality information is not transmitted through the physical control channel.

2. The signal processing method according to claim 1, wherein:

the information about time difference comprises at least one of: time of arrival of signals sent by the coordinated base station and the serving base station at the terminal, and data used for describing time difference of arrival between signals sent by the coordinated base station and the serving base station at the terminal; and the information about phase difference comprises at least one of: phase of arrival of signals sent by the coordinated base station and the serving base station at the terminal, and data used for describing phase difference of arrival between signals sent by the coordinated base station and the serving base station at the terminal.

3. The signal processing method according to claim 2, wherein sending the adjustment information to the serving base station comprises sending the adjustment information to the serving base station through a predefined channel.

4. The signal processing method according to claim 2, wherein sending the adjustment information to the serving base station comprises sending the adjustment information to the serving base station through a high layer signaling.

5. The signal processing method according to claim 1, wherein a format employed by the control signaling is format 1A; if the adjustment information is sent to the serving base station through the physical control channel, information bits of the format 1A satisfies: behind a format 0 or format 1A indicator, a localized/distributed virtual resource block assignment flag: a localized/distributed virtual resource block occupies 1 bit, wherein the 1 bit is set to '1'; resource block assignment: a resource block occupies $\lceil \log_2(N_{RB}^{DL}(N_{RB}^{DL}+1)/2) \rceil$ bits, wherein the $\lceil \log_2(N_{RB}^{DL}(N_{RB}^{DL}+1)/2) \rceil$ bits are all set to '1', and wherein $N_{RB}^{DL}$ represents downlink bandwidth; bits behind the 1 bit occupied by the localized/distributed virtual resource block, or behind the $\lceil \log_2(N_{RB}^{DL}(N_{RB}^{DL}+1)/2) \rceil$ bits occupied by the resource block are all set to '0'; or if the adjustment information is sent to the serving base station through the physical shared channel, information bits of the format 1A satisfies: behind a format 0 or format 1A indicator, a localized/distributed virtual resource block assignment flag: a localized/distributed virtual resource block occupies 1 bit, wherein the 1 bit is set to '1'; resource block assignment: a resource block occupies $\lceil \log_2(N_{RB}^{DL}(N_{RB}^{DL}+1)/2) \rceil$ bits, wherein the $\lceil \log_2(N_{RB}^{DL}(N_{RB}^{DL}+1)/2) \rceil$ bits are all set to '1', and wherein $N_{RB}^{DL}$ represents downlink bandwidth; the $\lceil \log_2(N_{RB}^{DL}(N_{RB}^{DL}+1)/2) \rceil$ bits represent the resource block transmitted through an uplink shared channel; bits behind the 1 bit occupied by the localized/distributed virtual resource block, or behind the $\lceil \log_2(N_{RB}^{DL}(N_{RB}^{DL}+1)/2) \rceil$ bits occupied by the resource block are all set to '0'.

6. The signal processing method according to claim 1, wherein sending the adjustment information to the serving base station comprises:

when the adjustment information is sent to the serving base station through the physical shared channel, the adjustment information is transmitted in a sub-frame n+4 through the physical shared channel, wherein the control signaling arrives at the terminal in a sub-frame n, wherein n is a non-negative integer.

7. A terminal, comprising:

a receiver, configured to receive a control signaling wherein the control signaling is used to instruct the terminal to send adjustment information to a serving base station of the terminal;

a processor, configured to determine channel state information between a coordinated base station and the terminal and between the serving base station and the terminal and to acquire information about time difference or information about phase difference of arrival between signals sent by the coordinated base station and the serving base station at the terminal according to the channel state information; and a transmitter, configured to send the adjustment information to the serving base station, wherein the adjustment information comprises the information about time difference or information about phase difference, and wherein the adjustment information is sent to the serving base station through a physical control channel or a physical shared channel, and wherein when the adjustment information is sent to the serving base station through the physical control channel, transmit the adjustment information through a physical control channel in a latest periodic channel quality information uplink sub-frame after the control signaling arrives and not transmit periodic channel quality information through the physical control channel.

8. The terminal according to claim 7, wherein:

the information about time difference comprises at least one of: time of arrival of signals sent by the coordinated base station and the serving base station at the terminal, and data used for describing time difference of arrival between signals sent by the coordinated base station and the serving base station at the terminal; and the information about phase difference comprises at least one of: phase of arrival of signals sent by the coordinated base station and the serving base station at the terminal, and data used for describing phase difference of arrival between signals sent by the coordinated base station and the serving base station at the terminal.

9. The terminal according to claim 8, wherein the transmitter is configured to send the adjustment information to the serving base station through a predefined channel.

10. The terminal according to claim 8, wherein the transmitter is configured to send the adjustment information to the serving base station through a high layer signaling.

11. The terminal according to claim 7, wherein a format employed by the control signaling is format 1A; if the adjustment information is sent to the serving base station through the physical control channel, information bits of the format 1A satisfies: behind a format 0 or format 1A indicator, a localized/distributed virtual resource block assignment flag: a localized/distributed virtual resource block occupies 1 bit, wherein the 1 bit is set to '1'; resource block assignment: a resource block occupies $\lceil \log_2(N_{RB}^{DL}(N_{RB}^{DL}+1)/2) \rceil$ bits, wherein the $\lceil \log_2(N_{RB}^{DL}(N_{RB}^{DL}+1)/2) \rceil$ bits are all set to '1', and wherein $N_{RB}^{DL}$ represents downlink bandwidth; bits behind the 1 bit occupied by the localized/distributed virtual resource block, or behind the $\lceil \log_2(N_{RB}^{DL}(N_{RB}^{DL}+1)/2) \rceil$ bits occupied by the resource block are all set to '0'; or if the adjustment information is sent to the serving base station through the physical shared channel, information bits of the format 1A satisfies: behind a format 0 or format 1A indicator, a localized/distributed virtual resource block assignment flag: a localized/distributed virtual resource block occupies 1 bit, wherein the 1 bit is set to '1'; resource block assignment: a resource block occupies $\lceil \log_2(N_{RB}^{DL}(N_{RB}^{DL}+1)/2) \rceil$ bits, wherein the $\lceil \log_2(N_{RB}^{DL}(N_{RB}^{DL}+1)/2) \rceil$ bits are all set to '1', and wherein $N_{RB}^{DL}$ represents downlink bandwidth; the $\lceil \log_2(N_{RB}^{DL}(N_{RB}^{DL}+1)/2) \rceil$ bits represent the resource block transmitted through an uplink shared channel; bits behind the 1 bit occupied by the localized/distributed virtual resource block, or behind the $\lceil \log_2(N_{RB}^{DL}(N_{RB}^{DL}+1)/2) \rceil$ bits occupied by the resource block are all set to '0'.

12. The terminal according to claim 7, wherein the transmitter is specifically configured to:
transmit the adjustment information in a sub-frame n+4 through the physical shared channel when the adjustment information is sent to the serving base station through the physical shared channel, wherein the control signaling arrives at the terminal in a sub-frame n, wherein n is a non-negative integer.

13. A signal processing method, comprising:
sending, by a serving base station of a terminal, a control signaling to the terminal, wherein the control signaling is used for instructing the terminal to send corrective information to the serving base station of the terminal; and
receiving, by the serving base station of the terminal, the corrective information sent by the terminal, wherein the corrective information comprises information about a time difference or information about a phase difference of arrival between signals sent by a cooperative base station and the serving base station at the terminal, wherein the corrective information is sent to the serving base station through a physical control channel or a physical shared channel, and wherein when the corrective information is sent to the serving base station through a physical control channel, transmitting the corrective information through the physical control channel in a latest periodic channel quality information uplink sub-frame after the control signaling arrives, and not transmitting periodic channel quality information through the physical control channel.

14. The signal processing method according to claim 13, wherein:
the information about time difference comprises at least one of: time of arrival of signals sent by the cooperative base station and the serving base station at the terminal, and data used for describing time difference of arrival between signals sent by the cooperative base station and the serving base station at the terminal; and
the information about phase difference comprises at least one of: phase of arrival of signals sent by the cooperative base station and the serving base station at the terminal, and data used for describing phase difference of arrival between signals sent by the cooperative base station and the serving base station at the terminal.

15. The signal processing method according to claim 14, wherein receiving, corrective information sent by the terminal comprises receiving, by the serving base station of the terminal, the corrective information sent by the terminal through a high layer signaling.

16. The signal processing method according to claim 13, wherein a format employed by the control signaling is format 1A; if the corrective information is received from the terminal through the physical control channel, information bits of the format 1A satisfies: behind a format 0 or format 1A indicator, a localized/distributed virtual resource block assignment flag: a localized/distributed virtual resource block occupies 1 bit, wherein the 1 bit is set to '1'; resource block assignment: a resource block occupies $\lceil \log_2(N_{RB}^{DL}(N_{RB}^{DL}+1)/2) \rceil$ bits, wherein the $\lceil \log_2(N_{RB}^{DL}(N_{RB}^{DL}+1)/2) \rceil$ bits are all set to '1', and wherein $N_{RB}^{DL}$ represents downlink bandwidth; bits behind the 1 bit occupied by the localized/distributed virtual resource block, or behind the $\lceil \log_2(N_{RB}^{DL}(N_{RB}^{DL}+1)/2) \rceil$ bits its occupied by the resource block are all set to '0'; or
if the corrective information is received from the terminal through the physical shared channel, information bits of the format 1A satisfies: behind a format 0 or format 1A indicator, a localized/distributed virtual resource block assignment flag: a localized/distributed virtual resource block occupies 1 bit, wherein the 1 bit is set to '1'; resource block assignment: a resource block occupies $\lceil \log_2(N_{RB}^{DL}(N_{RB}^{DL}+1)/2) \rceil$ bits, wherein the $\lceil \log_2(N_{RB}^{DL}(N_{RB}^{DL}+1)/2) \rceil$ bits are all set to '1', and wherein $N_{RB}^{DL}$ represents downlink bandwidth; the $\lceil \log_2(N_{RB}^{DL}(N_{RB}^{DL}+1)/2) \rceil$ bits represent the resource block transmitted through an uplink shared channel; bits behind the 1 bit occupied by the localized/distributed virtual resource block, or behind the $\lceil \log_2(N_{RB}^{DL}(N_{RB}^{DL}+1)/2) \rceil$ bits occupied by the resource block are all set to '0'.

17. The signal processing method according to claim 13, wherein receiving the corrective information sent by the terminal comprises:
when the corrective information is sent to the serving base station through the physical shared channel, transmitting the corrective information in a sub-frame n+4 through the physical shared channel, wherein the control signaling arrives at the terminal in a sub-frame n, wherein n is a non-negative integer.

* * * * *

UNITED STATES PATENT AND TRADEMARK OFFICE
CERTIFICATE OF CORRECTION

| | |
|---|---|
| PATENT NO. | : 9,537,562 B2 |
| APPLICATION NO. | : 14/272104 |
| DATED | : January 3, 2017 |
| INVENTOR(S) | : Fan Wang et al. |

It is certified that error appears in the above-identified patent and that said Letters Patent is hereby corrected as shown below:

In the Claims

In Column 18, Line 21, Claim 16, delete "its".

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*